W. C. BUCKNAM.
GAS WELDING AND CUTTING.
APPLICATION FILED JULY 12, 1912.
1,084,692.  Patented Jan. 20, 1914.
7 SHEETS—SHEET 2.
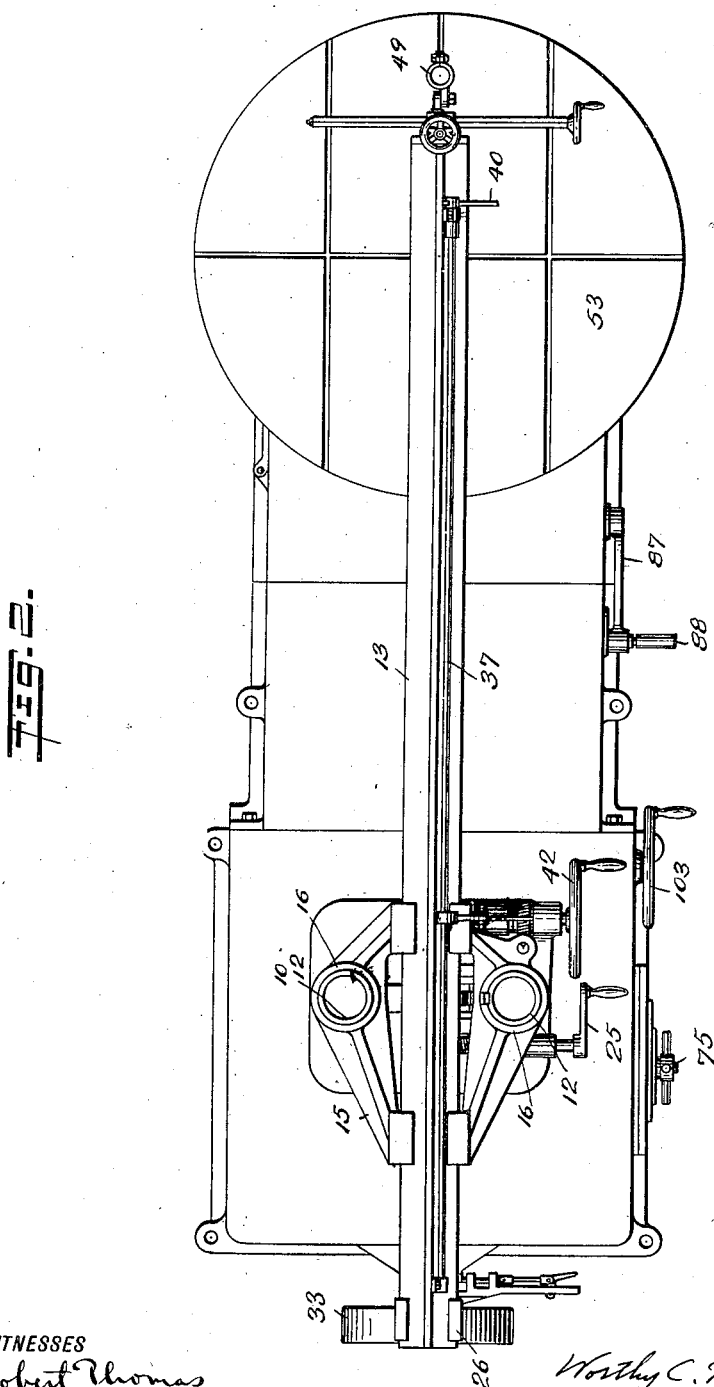

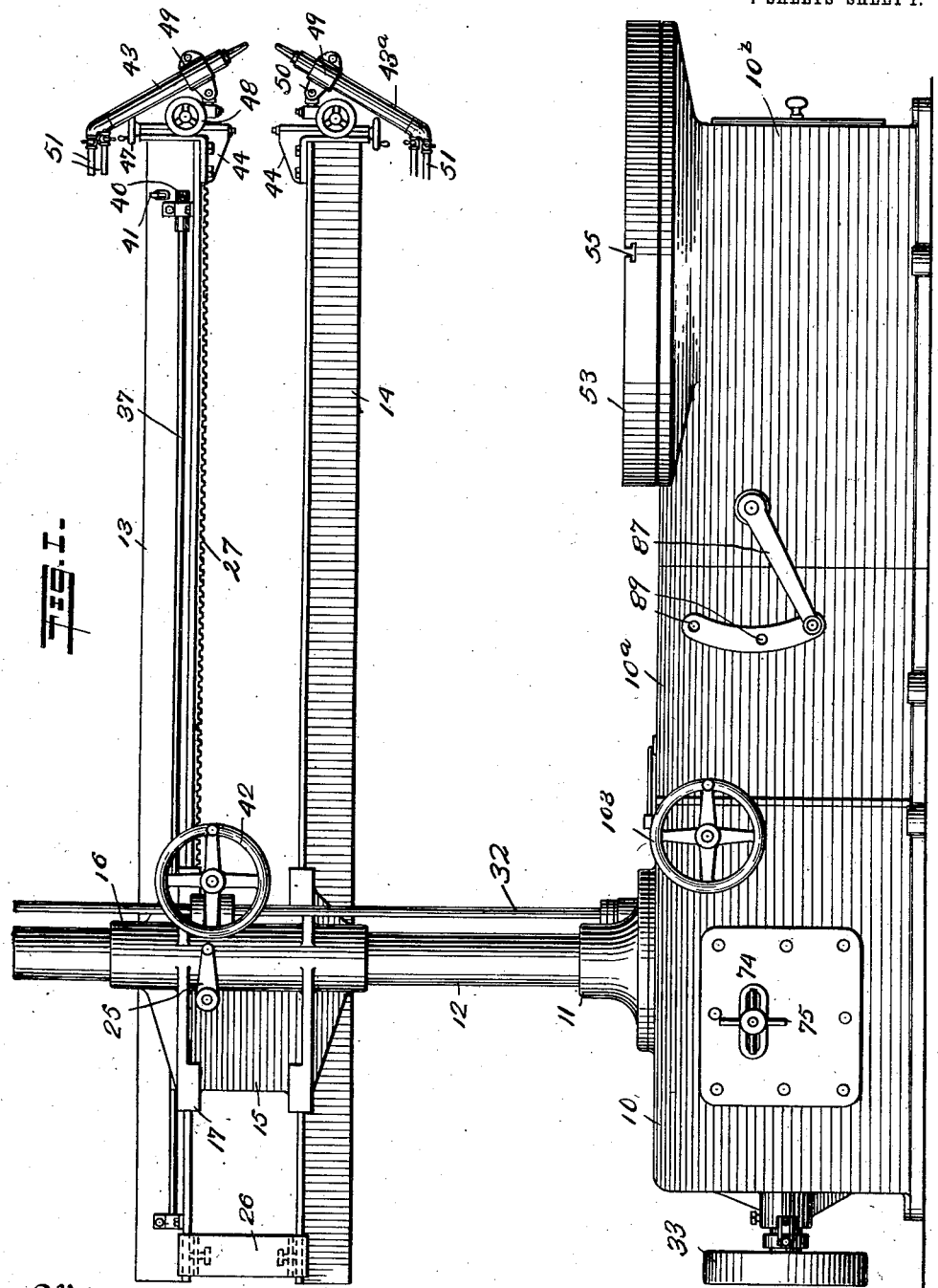

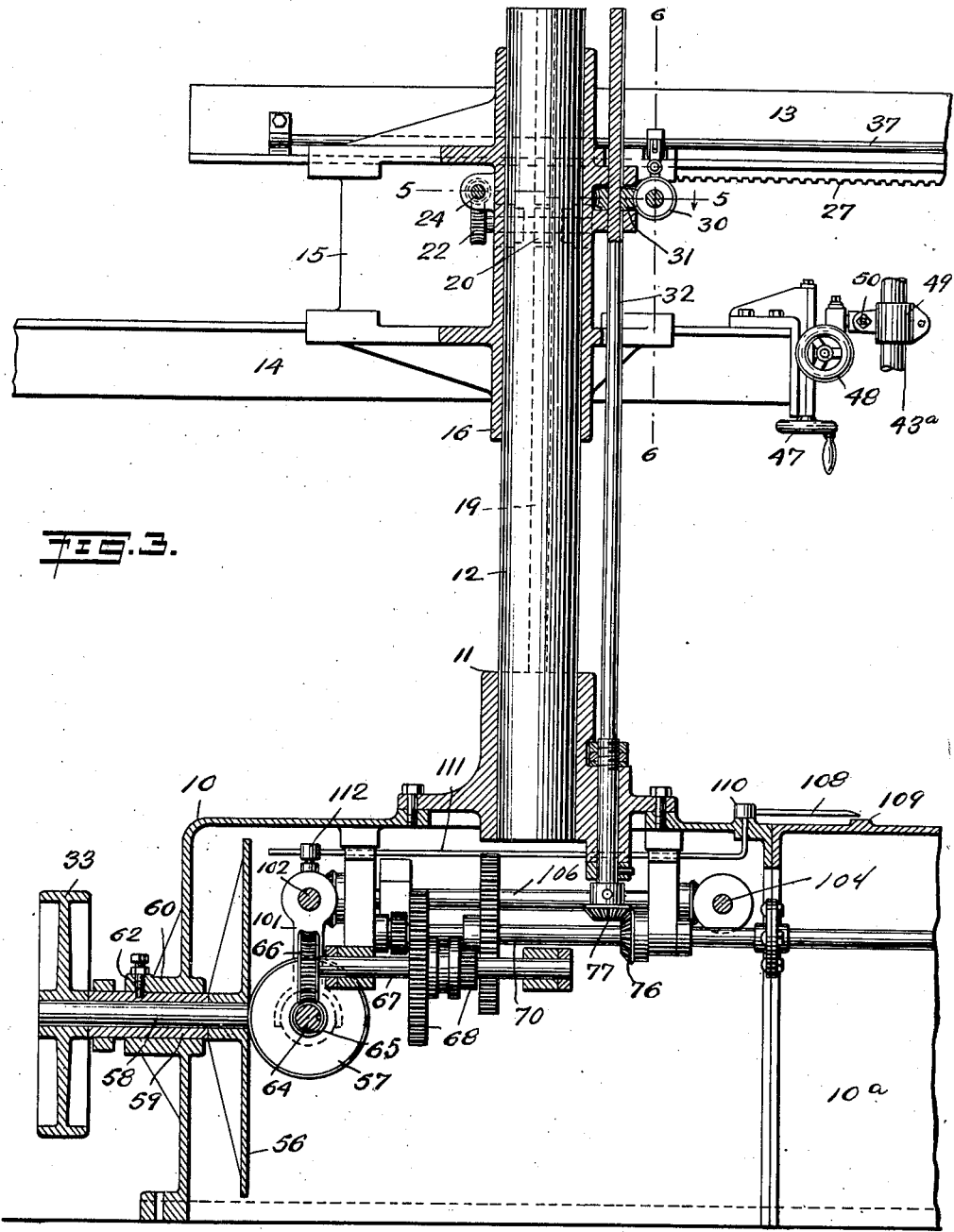

W. C. BUCKNAM.
GAS WELDING AND CUTTING.
APPLICATION FILED JULY 12, 1912.
1,084,692.
Patented Jan. 20, 1914.
7 SHEETS—SHEET 4.
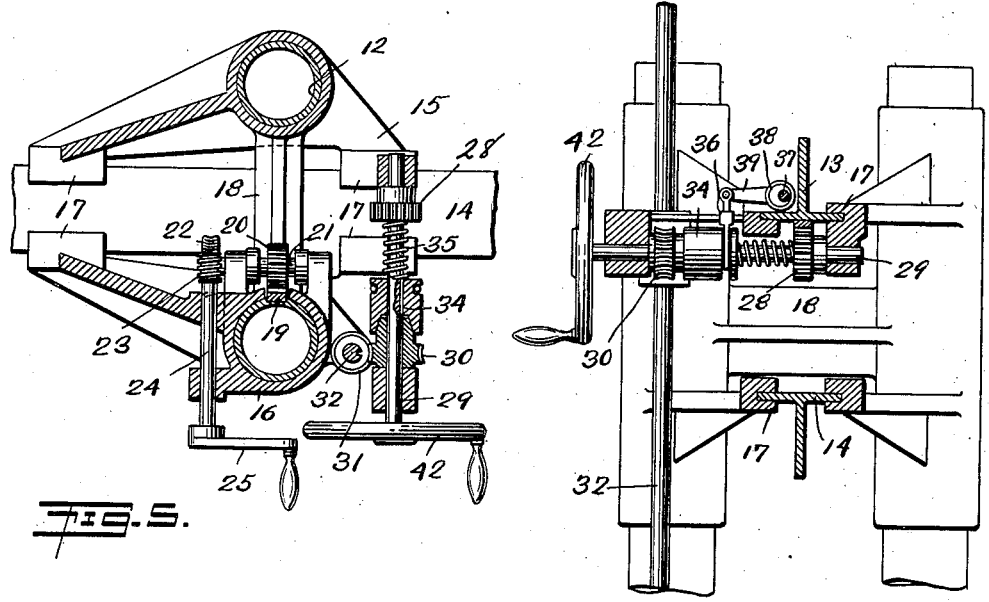
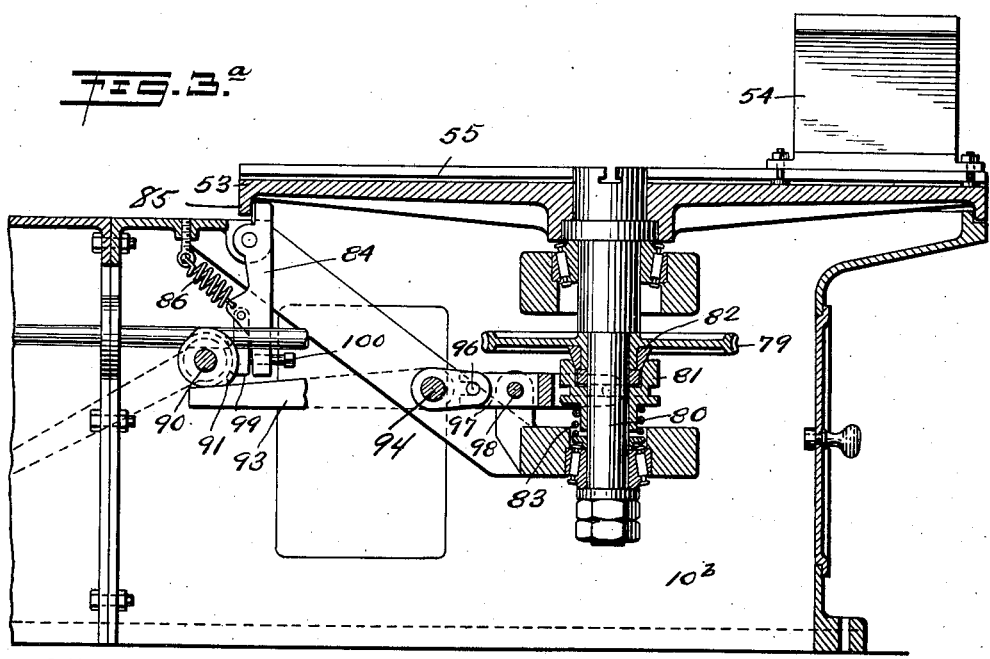
Witnesses:
G. Robert Thomas
M. M. Burnet
Inventor
Worthy C. Bucknam
By his Attorney

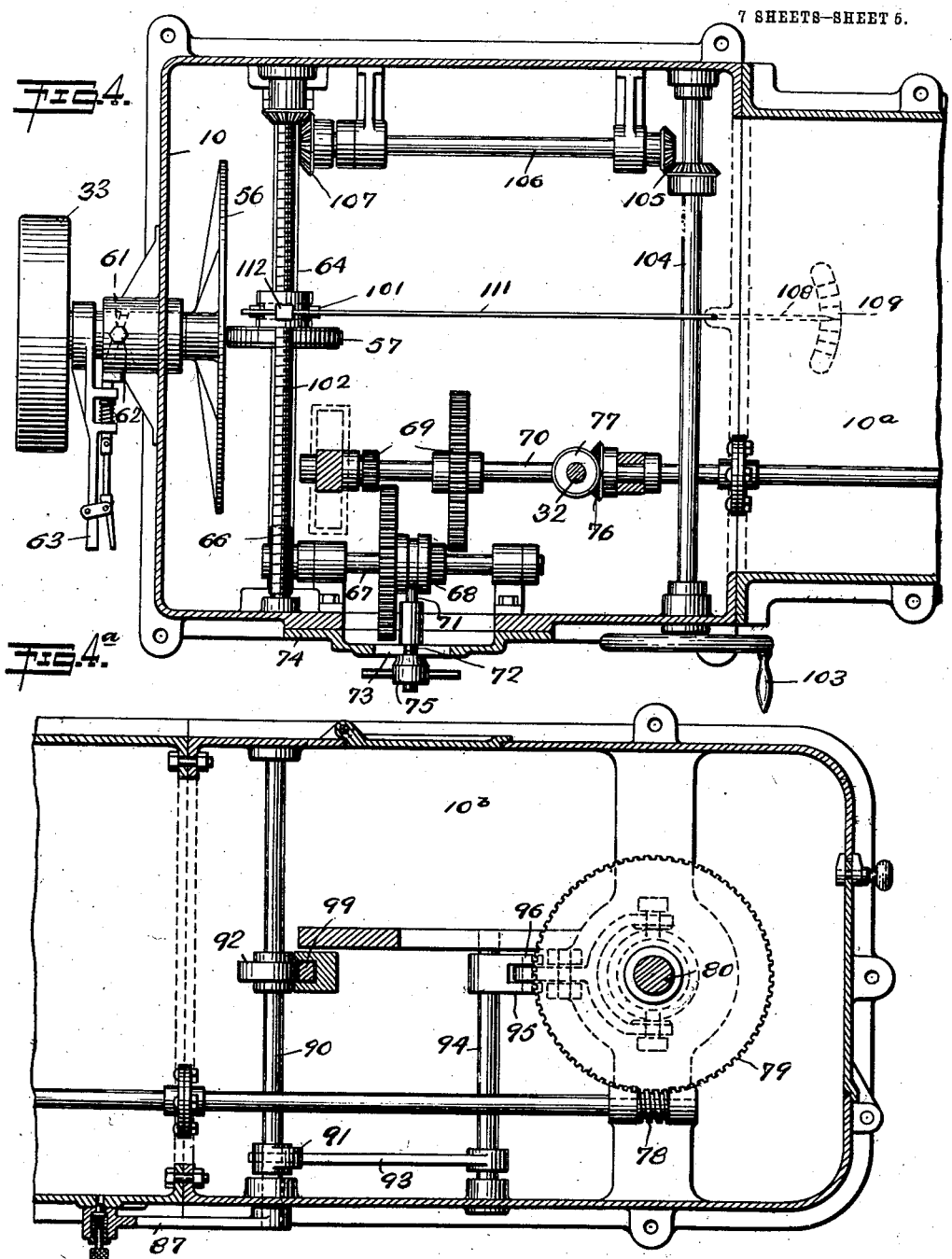

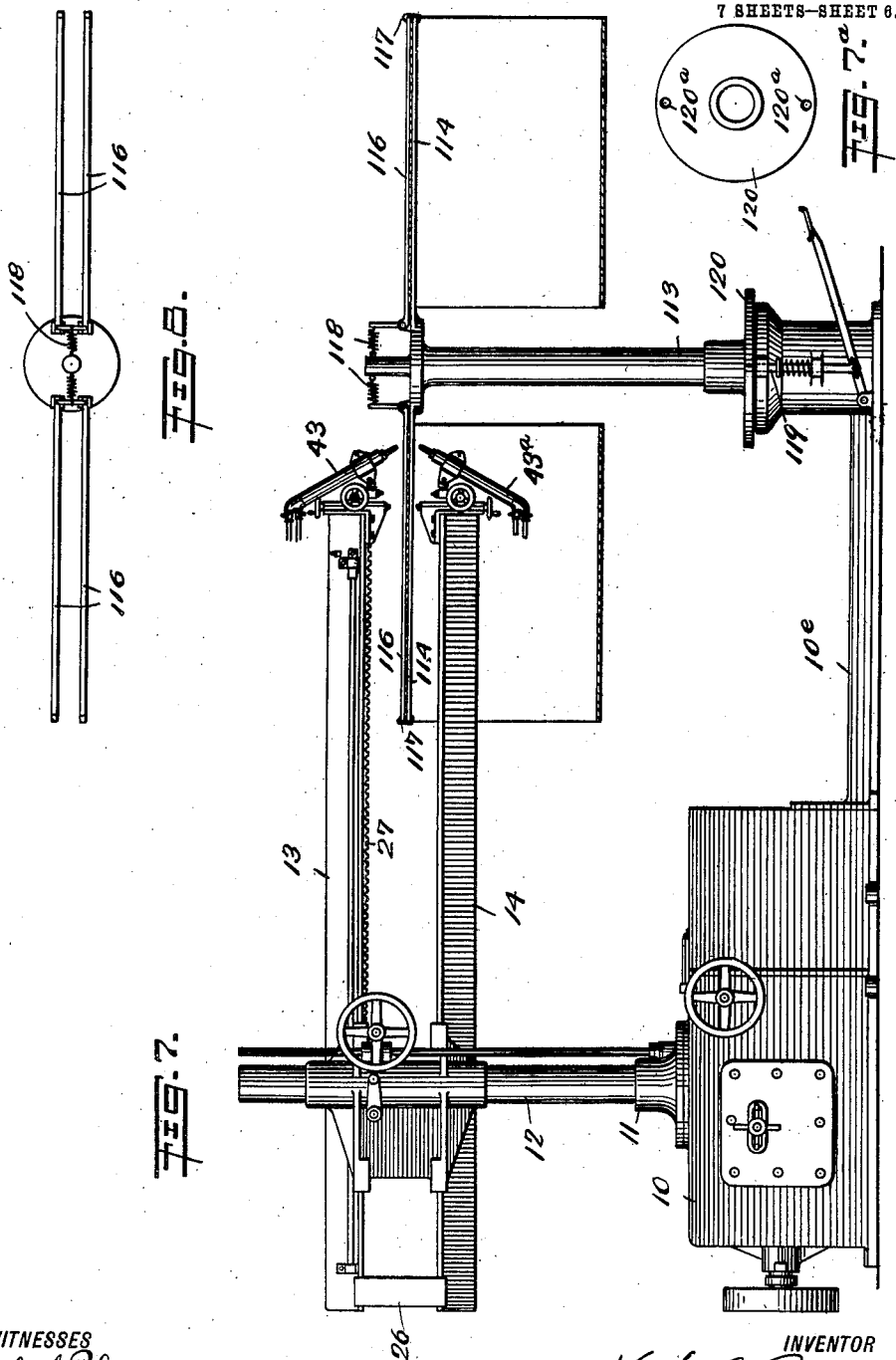

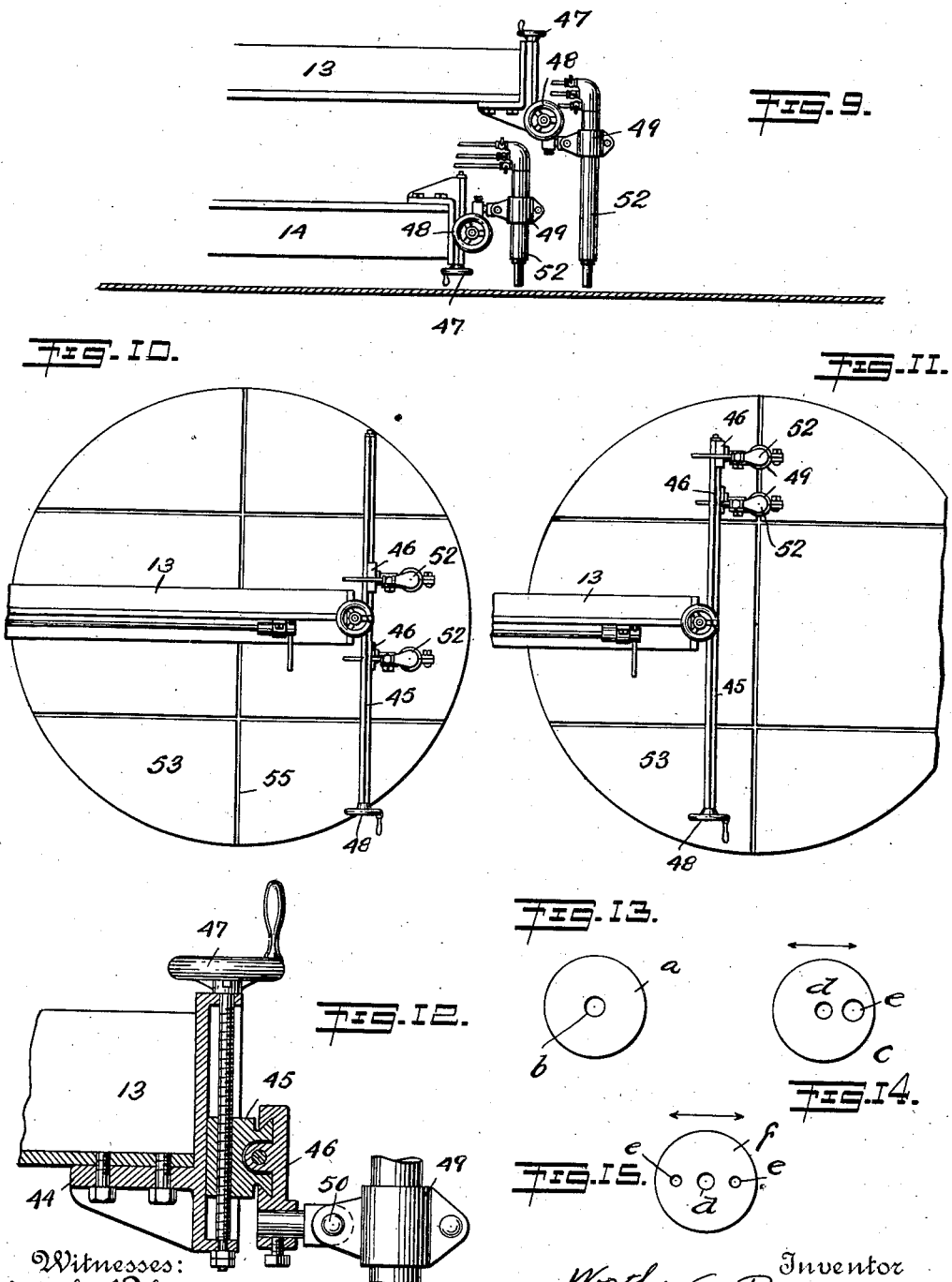

UNITED STATES PATENT OFFICE.

WORTHY C. BUCKNAM, OF JERSEY CITY, NEW JERSEY, ASSIGNOR TO DAVIS-BOURNONVILLE COMPANY, A CORPORATION OF NEW YORK.

GAS WELDING AND CUTTING.

1,084,692.  Specification of Letters Patent.  Patented Jan. 20, 1914.

Application filed July 12, 1912. Serial No. 709,079.

*To all whom it may concern:*

Be it known that I, WORTHY C. BUCKNAM, a citizen of the United States, and a resident of Marion, Jersey City, in the county of Hudson and State of New Jersey, have invented certain new and useful Improvements in Gas Welding and Cutting, of which the following is a specification.

This invention relates to apparatus for the welding and cutting of metals by means of gases such as oxygen and acetylene, and it relates more especially to machines for so-called automatic welding and cutting, in which the torch or jet-delivering means is supported, guided and driven mechanically to secure uniformity in the weld or cut.

Oxy-acetylene welding is a form of autogenous flame welding. The combustible mixture may consist of acetylene, hydrogen, or other inflammable gas, which, when mixed with oxygen and burned in the form of a comparatively small flame or jet, is capable of yielding such intense heat as to locally melt and fuse together the parts to be united. In autogenous flame welding the fusing flame is the sole or primary agent, and the art is thus clearly distinguished from that form of welding which is accomplished by hammering or pressure with metal which has been heated but not fused. In what may be termed antogenous flame cutting, jets of two kinds act upon the metal, one jet being a heating jet composed of a combustible mixture such as oxygen and acetylene, and the active jet consisting of substantially pure oxygen. These jets progress together along the work in the direction of the line of cut to be effected, and the oxygen or cutting jet rapidly oxidizes and thus cuts through the heated metal.

The object of the invention is to produce a machine for effecting welding or cutting of this character, which is accurate, rapid, reliable, convenient and capable of a wide range of usefulness and adaptability.

A further object is to present numerous novel features of construction, arrangement and relation susceptible of embodiment in whole, or in part, in numerous forms of apparatus.

A particular object of the invention is to provide apparatus for producing welded seams in sheet metal of improved character and more expeditiously and economically than has heretofore been possible.

As those familiar with the art are aware sheet metal welds made by the autogenous flame are butt welds.

These and various other objects and features of the invention will become apparent as the specification proceeds and will be more particularly pointed out hereinafter in the claims.

In the accompanying drawings illustrating the invention in its preferred embodiments: Figure 1 is a side elevation of the machine arranged to weld at both sides of the work simultaneously; Fig. 2 is a plan view of Fig. 1; Fig. 3 is an enlarged vertical section through the rear part of the machine; Fig. 3ª is a complementary vertical section through the forward part of the machine; Figs. 4 and 4ª are complementary sectional plans of the lower part of the machine; Fig. 5 is a section on the line 5—5 of Fig. 3, with parts in elevation; Fig. 6 is a section on the line 6—6 of Fig. 3, parts being in elevation; Fig. 7 is a side elevation showing the machine arranged for welding barrels; Fig. 7ª is a bottom plan view of a flange or collar, shown in Fig. 7, having detent sockets; Fig. 8 is a plan view of the work support shown in Fig. 7; Fig. 9 is a detail view showing the parts arranged to support two torches one behind the other, an arrangement which may be used for straight line work, the torches operating in tandem, or for circular work along concentric circles, the metal being rotated about a vertical axis below the torches; Fig. 10 is a plan view showing two torches supported abreast of each other and arranged to operate along spaced parallel straight lines; Fig. 11 is a plan view showing two torches abreast of each other and at one side of the center of the rotatable work table, this being an arrangement suitable for cutting concentric circles, or ring-cutting; Fig. 12 is a vertical section taken at the front end of one of the fore and aft arms; and Figs. 13, 14 and 15 are end views of the nozzles or tips of different forms of welding and cutting torches.

The numeral 10 indicates a base and housing having sockets 11 on its top in which are stepped spaced twin standards 12. Fore and aft radial arms or parallel supporting members 13, 14 are supported by these standards 12, and to render them vertically adjustable to different heights they are carried by a carriage 15 having twin sleeves 16 which slide on the standards. The arms 13, 14 are disposed one above the other and between the standards, and are guided for movement in the direction of their length. The construction and mode of guiding of the arms may be widely varied, but in the particular form illustrated they are in the nature of T-bars, the horizontal flanges of which are received in guides 17 on the carriage 15. The two parts of the carriage 15 are suitably and solidly united as by a web or connecting bridge 18. Suitable means are provided for moving the carriage 15 and for holding it at the desired elevation. In the particular construction illustrated one of the standards 12 carries a vertical rack 19 with which meshes a pinion 20 fixed to a shaft 21, which is journaled in bearings on the carriage. Such shaft also carries a worm wheel 22, which is meshed by a worm 23 fixed to a shaft 24 also journaled in bearings on the carriage 15. A crank handle 25 on the shaft 24 affords means for manual operation.

Means are provided for driving the arms 13, 14 in unison. To this end they are preferably united at their rearward parts so as to constitute in effect a bifurcated structure. The connecting means is separable so that one of the arms may be driven independently of the other. Any suitable construction for rigidly and solidly uniting the rear ends of the arms may be employed, as, for example, the clamping device shown at 26 which is clamped or bolted to the horizontal flanges of the arms and which may be permanently secured to one of them if desired. The means herein employed for driving the arms or one of them comprises a rack 27 formed on or secured to the under side of the upper arm 13 and a pinion 28 carried by the carriage 15 and meshing the said rack. The pinion 28 is fixed to a horizontal shaft 29, on which is loosely mounted a worm wheel 30 meshing with a worm 31 on a vertical shaft 32, which extends downward beside the standards 12 into the base 10 to connect with suitable gearing driven by a band-wheel 33 or by other suitable power means. The worm 31 is splined to the shaft 32 so that the carriage 15 may be raised and lowered without interfering with the drive. A slidable clutch member 34 splined to the shaft 29 affords means for connecting and disconnecting the pinion 28 and the worm wheel 30. The clutch member may be held in engagement with the complementary clutch member formed on the worm wheel 30 by means of a spring 35, and the clutch may be thrown out by a fork 36 operated by a rock shaft 37 on the arm 13, said shaft carrying an eccentric 38 which is connected with the fork 36 by an eccentric rod 39. A suitable handle 40 projects from the rod 37 and a detent 41 is arranged to hold the rock shaft in position with the clutch thrown out against the tension of the spring. In this condition the arm 13 may be driven manually by means of a hand wheel 42 fixed to the shaft 29.

At their forward ends the arms 13, 14 carry upper and lower reversely-directed torches 43, 43$^a$, which are thus caused to travel each in the direction of the length of its supporting arm. These torches are welding torches, that is to say, devices having provisions for mixing a combustible and combustion-supporting gases, such as acetylene and oxygen, and delivering them in the form of an ignited jet upon the work. They may be of any suitable construction, for example, such as is disclosed in Fig. 5 of the patent to J. W. Whitford, No. 1,028,166 of June 4, 1912, except that the tip or nozzle is preferably in line with the body or handle. Means are provided for effecting accurate adjustment of these torches up and down and transversely on their arms. To this end a bracket 44 is fixed to the end of each arm. A carriage 45 is slidably guided for vertical movement on the bracket, and a second carriage 46 is slidably guided on the first for transverse movement, screws with operating handles 47, 48 being provided for moving the two carriages. The carriage 46 in each instance carries a torch holder 49, which is conveniently in the form of a split clamping collar, in which the torch is removably mounted. The bodies of the torches are made cylindrical and plain so that a further up and down adjustment may be secured by moving them longitudinally in their holders. Angular adjustment of the torches to direct the jets either perpendicular to the surface of the work or at any inclination is provided for by pivoting the holders 49 to the carriages 46, as indicated at 50. Flexible connections 51 are provided for leading the gases to the torches, there being two of these conduits for a welding torch.

For cutting, a cutting torch, indicated at 52 in Fig. 9, is substituted for the welding torch 43 of the upper arm 13, the lower arm 14 being disconnected and pushed back out of the way. Any suitable form of cutting torch may be used for this purpose, for example of the same general character as is shown in Patent No. 1,028,410 to J. W. Whitford, dated June 4, 1912. As is well understood in the art a cutting torch delivers two kinds of jets, a heating jet composed of a mixture such as oxygen and acetylene, and a cutting jet consisting of pure oxygen. Three flexible connections 51 may be employed to lead the heating oxygen and the combustible gas to the cutting torch.

With the lower arm 14 pushed back out of the way, as shown in Fig. 3, the upper arm may be used either for welding or cutting, according to the nature of the torch carried thereby.

From the foregoing it will be perceived that the two arms 13, 14 may be united together and driven as one bifurcated structure or frame, so that the torches carried thereby travel together, or the two arms may be disconnected, the lower arm being pushed back out of the way and the upper arm alone being driven, or the arms with their torches may remain stationary, the relative movement between the torches and the work to produce a linear cut or weld being effected by moving the work.

The apparatus may be constituted so as to produce a welded seam in a novel manner, by means of coöperating welding flames at opposite sides of the work. For such purpose the work is suitably supported with the edges of the metal sheets or plates to be united presented in a plane lying between the fore and aft arms and the parts carried thereby. Welding torches are mounted on the arms and suitable adjustments of the work and of the torches are effected, so that the welding jets will be delivered in fixed coöperative relation upon the line of weld to be effected, preferably in converging relation as shown in Fig. 1, and relative movement between the jets and the work is then produced in the direction of the line of weld, so that the upper and lower jets, by their coöperative and simultaneous action, fuse the seam together very rapidly and with very small consumption of gas. In this way a very strong seam, closed at both sides, is produced more expeditiously and economically than were the seam welded to the same depth but from one side only.

Figs. 1, 2 and 3ª show one form of work support comprising a rotatable table 53 located in advance of the standards 12. Work, as plates, bars, cans, etc., may be placed directly on this table to be either welded or cut, or the work may be supported in an elevated position by suitable removable holders or supports, one of which is indicated at 54 in Fig. 3ª, the same having means for engagement with T-slots 55 formed in the table. This table may be held stationary while one or both of the arms with their torches are driven to produce a straight line cut or weld, or it may be mechanically rotated while one of the torches is held stationary for circular cutting or welding, or it may be disconnected from the power-driven means so that it may be turned by hand to present or shift the work in the desired manner with reference to the welding or cutting device. The particular constructions illustrated for attaining these ends as well as the particular illustrated form of drive mechanism common to the arms 13, 14 and the table 53 will now be described.

The base 10 has forward sectional extensions 10ª and 10ᵇ, which are bolted together and to the section 10, so that one or both of them may be removed. The table 53 is supported on the front section 10ᵇ. On the shaft of the pulley 33 inside the base 10 is fixed a friction disk 56 which may drive a friction wheel 57. The disk 56 may be moved out of engagement with the wheel 57 so as to throw off the power from the machine entirely. To this end the shaft 58 rotates in a bushing 59 which may be turned inside a bearing 60 on the base. The bushing 59 has a helical cam slot 61, which is engaged by a fixed pin 62, so that turning of the bushing by means of a handle 63 fixed thereto causes the bushing, and consequently the shaft 58 and the friction disk 56, to move axially either toward or from the friction wheel 57. The friction wheel 57 is splined on a shaft 64, which, at one end, carries a worm 65 that drives a worm wheel 66 mounted on a shaft 67. A slidable set of change-speed gears 68 is splined on the shaft 67 for selective engagement with a set of gears 69 fixed on the longitudinal shaft 70. Obviously this change-speed gearing may be of any suitable nature. The gears 68 are shown as shifted by means of a fork 71 having a screw stem 72 passing through a horizontal slot 73 in a door 74, a nut 75 with handle pieces being screwed onto the stem outside of the door for the double purpose of providing an operating handle and for locking the shiftable set of gears at the desired position. The shaft 70 drives the vertical shaft 32, already referred to, by means of beveled gears 76, 77. The shaft 70 extends forward through the base sections 10ª and 10ᵇ and at its forward end carries a worm 78 which drives a worm wheel 79, which is mounted loosely on the spindle 80 of the table 53. A slidable clutch member 81 is splined on the shaft 80, and is pressed up into engagement with a complementary clutch member 82 fixed to the gear 79 by a spring 83. A brake or table stop 84 is provided for holding the table motionless and may be in the form of a lever pivoted to the base section 10ᵇ and carrying a friction surface on its shorter arm to engage with the inner surface of a depending peripheral rim 85 on the table. The brake is pulled away from the table by a spring 86. Means are provided for operating both the clutch 81 and the brake 84. For this purpose there is a crank handle 87 outside of the section 10ᵇ, which is provided at its end with a spring pin 88 to engage with any one of a series of three holes 89 in the side of the section 10ª. It is fixed to a rock shaft 90 which carries two cams 91 and 92. The cam 91 is constructed and arranged to engage with the end of an arm 93, which is fixed to the rock shaft 94. The latter carries a crank arm 95, which is loosely pivoted at 96 to a yoke lever 97 that is pivotally supported intermediate its ends at 98, the result being that depression of the arm 93 forces the clutch member 81 downward against the tension of the spring 83, thereby throwing off the power from the table. When the cam 91 is moved to permit the arm 93 to rise, it causes the clutch to be again thrown in by the power stored in the said spring. The cam 92 contacts with an adjustable shoe 99 pivoted to the brake lever 84 and adjustable by a screw 100. The relation of the cams is such that with the operating lever 87 in the position shown in Fig. 1 the clutch 81 is thrown in and the brake 84 is held out of engagement with the table by the spring 86. Movement of the lever 87 to intermediate position causes the cam 91 to depress the arm 93 so as to disconnect the clutch 81, 82. During this movement, however, the concentric portion of the cam 92 is still in contact with the shoe 99 so that the brake lever is not moved into engagement with the table. In this position the table may be turned by hand to any desired position. When the operating lever 87 is in its uppermost position the clutch member 81 is still held out of engagement with the clutch member 82, and the cam 92 forces the brake lever 84 into forcible contact with the table rim 85.

Exact speed variation may be secured by shifting the friction wheel 57 over the surface of the friction disk 56, for which purpose it is shown as being movable by a fork 101, which has threaded engagement with a screw 102. The latter is rotated to cause the fork to move in one direction or another by means of a handle 103 outside the base, the same being connected with the screw 102 by a suitable arrangement of shafts and gearing 104, 105, 106, 107. An index hand 108, coöperating with a scale 109 on top of the base section 10$^a$, indicates the position of the friction wheel 57. For this purpose it is pivoted at 110 and is provided with a rearward extension 111, which is slidably received in a sleeve 112 swiveled to the fork 101.

In Figs. 7 and 8 the machine is shown as provided with another form of work support, designed particularly for the welding of the longitudinal joints of metal barrels. Here a base section 10$^c$ is substituted for the section 10$^b$, and carried by this base section is a rotatable vertical shaft 113, having a suitable number of diametrically-opposite radial arms 114. Two arms are shown, but obviously four or other suitable number might be employed. The open-ended barrels are placed endwise onto these arms with the edges to be welded uppermost. Each arm comprises two parallel spaced bars 115, and the two edges of the barrel are held contiguous to each other for welding by means of suitable clamp strips 116, pivoted at their inner ends to the arms and engaged by suitable latches 117 at their outer ends to hold them tightly against the work. When these latches are released the clamps may be moved upward automatically a suitable distance by springs 118, or in any other suitable manner. In order to secure a firm holding connection the clamp strips may be bowed downward between their ends. The barrel bodies to be welded are placed one at a time on the forward-projecting arm and the welding is performed on the barrel on the rearward-projecting arm. When the welding of this barrel body is completed the rotatable support is turned through a half revolution so that the new barrel body is carried to the rear to be welded, the welded body being brought to the front, where it is removed and replaced by another unwelded body. Means are provided for stopping and holding the work support in position with the joint of the barrel body in parallelism with the line of travel of the welding jet. Such means may be widely varied. For the purposes of illustration there is shown a stop 119 which arrests the work support after it has turned through 180°, and which may be released by the foot of the operator so that the support may be turned through the next half revolution. The said stop is conveniently in the form of a spring-pressed, foot-retracted plunger that rides on the under surface of a circular flange 120 and takes automatically into sockets 120$^a$ which are positioned to stop and hold the rotary support after the successive half revolutions. The arms 114 are bifurcated or slotted so that the joint may be welded from the under side as well as from the upper side. The arms 13, 14 are united together and are adjusted to the proper height by movement of the carriage 15. Individual adjustment of the two autogenous welding torches 43, 43$^a$ upward and downward, transversely and angularly, is effected so that the two welding flames will converge upon the joint from opposite sides. The arms having been drawn rearward are now connected with the power drive and are caused to travel forward gradually and uniformly so that one torch passes over the barrel and the other inside it, the flames thus progressing along the line of the weld until the edges of the metal have been united from end to end. The arms or traveling frame are then moved rearward into position to commence another weld and the work support is turned so as to present a fresh barrel body in position to be welded, and to permit removal of the welded body.

Various operations may be performed with the machine when provided with the form of work support shown in Figs. 1, 2 and 3$^a$. Sheets, plates, can bodies, etc. to be welded may be supported on or above the table 53 in such manner that the lower arm 14 with its torch 43$^a$ may travel below the joint while the torch 43 travels above it, so that welding may be effected at both sides. The torches are driven simultaneously and the work table is held stationary during an operation of this character. Straight line welding of the ordinary character may be performed by disconnecting the arm 14 from the arm 13 and moving it backward, out of the way, the work being suitably supported by the table 53 and the upper arm 13 with its welding torch 43 being driven independently of the lower arm. In the same manner cutting may be effected by substituting a cutting torch for the torch 43. Circular cutting or welding may be effected by driving the table and positioning either of the arms so that the torch carried thereby is disposed over the work and with its jet directed to play upon the metal at the desired distance from the rotational axis of the table. In this instance, of course, the torch is not driven. If the lower arm 14 is used for this purpose the torch carried thereby is, of course, inserted in the holder 49 so that it is directed downward instead of upward. For operating on small can bodies or other tubular bodies to be welded from the inside as well as from the outside, the lower arm 14 with the carriages and adjustments on the forward end thereof and the supported torch may be made as small and compact as may be desirable.

An important feature of the invention is the provision of means for positioning the torches in different relative positions and effecting relative adjustments. These provisions make possible a number of desirable cutting and welding operations. It will be seen that the torches may be relatively adjusted in directions parallel to the work, either by disconnecting the arms 13, 14 and disposing one of them farther outward and the other farther inward, as shown in Fig. 9, in which relation the arms may be secured together if desired, or by adjusting the torches transversely, by means of the carriages 46 and screws 48, so that the torches are laterally spaced, as shown in Figs. 10 and 11. The torches used under these circumstances may be cutting or welding torches, according as it is desired to cut or weld, and the torches may be reversely disposed, that is, one pointing upward and the other downward to act on opposite sides of the work, but the most desirable arrangement will be to point both of the torches in the same direction. The result of these relative arrangements will be that the cutting or welding jets, as the case may be, will act along different lines, a constant distance apart, or along the same line (or in the same plane), one a constant distance in advance of the other. These arrangements are particularly advantageous for cutting. To produce two parallel straight line cuts simultaneously two cutting torches 52, are mounted in the holders 49 and the carriages 46 are adjusted so as to space the torches at the desired distance apart, laterally, corresponding to the distance to be preserved between the cuts; then relative rectilinear movement between the work and the torches is effected, in this particular machine by driving the torches, so that they travel in parallelism. It will be observed that for this operation it is not essential, though desirable, that the torches be abreast of each other, since one might be farther forward than the other. With both torches pointing downward, as shown in Fig. 9, it will be understood that torches of suitable length will be used and that the lower one will be pushed up in its holder and the upper one pushed down so that the delivery ends of their tips are on a level. For cutting concentric circles simultaneously, the cutting torches may be relatively adjusted transversely as just described, the jets of both being directed upon the work at one side of the center of rotation of the work table 53 which is then rotated while the torches remain stationary. This mode of operation is very advantageous for cutting metal rings out of sheets or plates. The dimensions of the rings cut may be varied by relatively adjusting the torches. Or the same results may be attained by relatively adjusting the arms 13, 14 longitudinally, so that the gas jets will play upon the work either both in front or both in rear of the axis of the table, which is rotated as before, while the torches remain stationary.

It will be observed that the arms 13, 14 may be united together at any desired relative longitudinal adjustment and driven in this relation, so that one torch travels ahead of the other, and that this applies either to cutting or welding, according as the torches supported by the arms are cutting or welding torches. For welding the rear torch may deliver a welding flame in the ordinary manner, and the preceding torch at a slight distance in advance may deliver a preheating flame composed of a gas or gases of lower calorific power. This relative longitudinal adjustability of the fore and aft arms may be made use of in connection with welding a joint simultaneously from opposite sides of the work, since the upper and under welding jets may be delivered upon vertically opposite points, or in slightly spaced relation, so that the flame at one side has a slight advance over the flame at the other side. The same result may be achieved by slightly varying the angles of the torches, by tilting one of the holders 49, so that the jets are not delivered at exactly equal angles to the work.

It will be understood that the machine is susceptible of still other uses.

Attention is called to the value of the variable speed friction drive in connection with a power-operated gas welding and cutting machine. It has been found that the success of cutting in particular, and of welding also to a considerable degree, is dependent directly on the speed at which the cut or weld progresses, that is to say the relative speed of the torch and the work. For a given piece of cutting, a certain uniform speed must be observed, otherwise the cutting operation will be interrupted and must be begun all over again, with the probability of a ruined job. Variable speed friction gearing as applied to the relative driving of the cutting or welding jets and the work is therefore of the greatest importance, since it enables the speed to be regulated with exactitude. The indicator, as 108, 109, connected with the speed changing means of such gearing is of particular advantage in that it enables the operator to tell at a glance what the speed is and when he has adjusted the drive to the desired speed. The reason of connecting the speed changing screw 102 with the operating handle 103 by the shafting 104, 106, is to enable the controller handle to be placed sufficiently far forward to be capable of convenient operation.

Figs. 13, 14 and 15 represent the ends of the tips or nozzles of certain styles of welding and cutting torches that may be employed in connection with the invention. In Fig. 13 *a* is the tip of a welding torch having an outlet orifice *b* for the welding jet, consisting of a combustible mixture, as oxygen and acetylene. In Fig. 14 *c* is the tip of a cutting torch having a delivery orifice *d* for the cutting or oxygen jet and a single orifice *e* for a heating jet, consisting of a combustible mixture, as oxygen and acetylene. The arrow indicates that the heating jet precedes or is located in advance of the cutting jet. In Fig. 15 *f* is another cutting nozzle, having a cutting jet orifice *d*, and two heating jet orifices *e* at opposite sides, that is to say, in front and rear of the oxygen jet. The double arrow indicates that the relative motion between the torch and the work may be performed in either direction. Many other forms of welding and cutting blow-pipes may be used.

The machine herein described constitutes one embodiment of apparatus for carrying into effect the welding process more particularly described and claimed in a division hereof, filed December 10, 1912, Serial No. 735,909.

The advantages of welding at both sides of the work may be realized to a certain degree by directing a welding flame upon one side of the work and an assisting heating flame upon the other side, and producing relative movement between the flames and work in the direction of the line of weld. The assisting flame may be of the same composition as the main or welding flame but of smaller size so as not to weld at the speed at which the torches or the work are driven, or it may be a flame of different composition and of lower calorific power. Again, the second flame may be of proper composition for welding purposes and though smaller than the main flame at the opposite side still powerful enough to weld to a certain depth. Where the second flame serves entirely or primarily as an assisting heating flame, as distinguished from a welding flame, it is preferably slightly in advance of the main flame, say about three-quarters of an inch; but such assisting flame may play upon the work at a point directly opposite the main flame if desired.

It will be understood that the invention is not necessarily limited to the use of two torches and that more may be employed if desirable.

Claims for the machine as organized for barrel welding are not included in this case, this subject-matter being reserved for a separate application.

While I have illustrated and described my preferred constructions with particularity, it will be understood that I am not limited to precise details and that numerous changes may be made without departing from the invention.

What I claim as new is:

1. In a gas welding and cutting machine, the combination of a base having a standard, a carriage movable up and down to different heights on said standard, a fore and aft arm supported by said carriage, means for mechanically driving said arm at uniform speed in the direction of its length and relatively to said carriage, and a torch carried by said arm.

2. In a gas welding and cutting machine, the combination of a base having a standard, a fore and aft arm supported at an elevation by said standard and carrying a rack, mechanism including a pinion meshing with said rack for driving said arm in the direction of its length and relatively to said standard, and a torch carried by said arm.

3. In a gas welding and cutting machine, the combination of a base having a standard, a carriage movable up and down to different heights on said standard, a fore and aft arm supported by said carriage and carrying a rack, mechanism including a pinion carried by said carriage and meshing with said rack for driving said arm in the direction of its length and relatively to said carriage, and a torch carried by said arm.

4. In a gas welding and cutting machine, the combination of a base having a standard, a carriage movable up and down to different heights on said standard, a fore and aft arm supported slidably by said carriage and carrying a rack, a pinion carried by the carriage to mesh with said rack, driving means supported by the base, connections for driving said pinion from said means, and a torch carried by said arm.

5. In a gas welding and cutting machine, the combination of a base having a standard, a fore and aft arm movable longitudinally relatively to said standard and carrying a rack, a pinion supported by the standard to drive said rack, a handle for turning said pinion, means for power drive carried by the base, a vertical shaft driven thereby, a gear on said shaft, a gear driven by the gear on said shaft, a clutch connection between said driven gear and said pinion, and a torch carried by said arm.

6. In a gas welding and cutting machine, the combination of a base having twin standards, a carriage slidable up and down on both standards to be located at different heights, a fore and aft arm carried by said carriage between said standards, means for mechanically driving said arm at uniform speed in the direction of its length, and a torch carried by said arm.

7. In a gas welding and cutting machine, the combination of a base having a standard, a fore and aft traveling arm supported by the standard, means for mechanically driving said arm at uniform speed in the direction of its length, a torch carried by the forward part of said arm, and means for effecting accurate adjustment of said torch relatively to said arm.

8. In a gas welding and cutting machine, the combination of a base having a standard, a carriage movable up and down to different heights on said standard, a longitudinally traveling fore and aft arm carried by said carriage, a torch holder, successively mounted carriages supporting said torch holder from the forward end of said arm, and means for effecting accurate up and down and transverse adjustments of said carriages.

9. In a gas welding and cutting machine, the combination of a base having a standard, upper and lower fore and aft arms supported and rectilineally guided on said standard, upper and lower autogenous torches carried by the forward parts of said arms to act upon opposite sides of work disposed between the arms, and mechanical means for synchronously driving said arms in the direction of their length.

10. In a gas welding and cutting machine, the combination of opposed autogenous torches, spaced arms supporting said torches at their forward parts and united at their rearward parts, guide means confining said arms to straight line longitudinal movement, and means for mechanically driving said united arms at uniform speed.

11. In a gas welding and cutting machine, the combination of a support, upper and lower horizontal arms adapted to receive the work between them, downward and upward directed autogenous torches carried by said arms, and means for mechanically driving said torches simultaneously and uniformly one above the other in fixed paths parallel with the longitudinal axes of said arms.

12. In a gas welding and cutting machine, the combination of a base with a standard, a carriage adjustable up and down thereon, upper and lower arms carried by said carriage, upper and lower autogenous torches supported by said arms, means for driving said torches in unison in directions parallel with the longitudinal axes of said arms, and means for effecting individual up and down and transverse adjustments of said torches relatively to said arms.

13. The combination of reversely directed autogenous welding torches adapted to act upon opposite sides of work placed between them, movable supports for said torches, means for solidly supporting and guiding said supports for parallel movement in fixed paths, mechanical means for driving said supports in a substantially uniform and continuous manner, and means whereby one or both of said supports may be connected with said driving means.

14. In a gas welding and cutting machine, the combination of a support, parallel movable arms supported thereby, means confining said arms to straight line movement in the direction of their length, torch holders carried by the forward parts of said arms, mechanical driving means acting upon one of said arms, and a separable coupling for uniting said arms at their rearward parts.

15. In a gas welding and cutting machine, the combination of a standard, a horizontal support mounted thereon, an autogenous torch carried by said support, means for propelling the torch at uniform speed in the direction of the length of said support, and a work support below said horizontal support rotatable about a vertical axis.

16. In a gas welding and cutting machine, the combination of a standard, a horizontal support mounted thereon, a torch carried by said support and adapted to be driven in the direction of the length thereof, a rotatable work support below said horizontal support, driving means, and means for connecting said torch and said work support or either of them with said driving means.

17. In a gas welding and cutting machine, the combination with a torch support, of a rotatable work support, driving means, means for connecting and disconnecting said work support and said driving means, and stop means to hold the work support against movement operated by said connecting and disconnecting means.

18. In a gas welding and cutting machine, the combination with a torch support, of a rotatable work support, a device to hold the same motionless, driving means, a clutch for connecting the work support with the driving means, controlling means for throwing out the clutch and by a further movement to apply said holding device, reverse movement of said controlling means releasing the holding device and by a further movement throwing in the brake, and means for retaining said controlling means in position with both the clutch out and the holding device released.

19. In a machine for the cutting of metals by means of gases, the combination of a plurality of cutting torches having heating and cutting jet provisions, means for supporting and relatively adjusting the same to act on the work along spaced lines at a variable distance apart, and means for producing relative circular travel between the torches and the work about an axis perpendicular to the surface of the latter, whereby rings of various sizes may be cut.

20. In a gas welding and cutting machine, the combination of two torch supports, means for holding torches thereon either in reverse relation at opposite sides of the work or with their jets directed at the same side of the work, means for adjusting the torches so as to act upon the work either along the same line or along spaced lines, and means for effecting relative travel between the work and the torch supports.

21. In a gas welding and cutting machine, the combination of parallel arms, autogenous torches carried thereby, a support on which said arms are relatively adjustable and confined for straight line movement in the direction of their length, means for uniting said arms at various relative longitudinal adjustments, and means for driving the united arms longitudinally.

22. Apparatus for producing welded seams, comprising devices for delivering autogenous welding flames, means for supporting the work with its edges to be united contiguous to each other and in such manner as to permit said autogenous flame welding devices to act upon and along both sides of the seam, means solidly supporting said devices in positions to cause their flames to play in fixed coöperative relation upon the seam at opposite sides of the work, and mechanical driving means for producing substantially uniform and continuous relative travel between the coöperating flames and the work lengthwise of the seam.

23. Autogenous seam-welding apparatus, comprising the combination of reversely disposed autogenous welding jet devices, means for solidly supporting said devices in coöperative relation at opposite sides of the work, and means for producing substantially uniform and continuous relative travel between the coöperating jets and the work lengthwise of the seam.

In witness whereof I have signed my name in the presence of two subscribing witnesses.

WORTHY C. BUCKNAM.

Witnesses:
J. F. BRANDENBURG,
LUELLA F. LITTLE.